Sept. 10, 1940.   G. V. RYLSKY   2,214,181
RATE OF CLIMB RESPONSIVE MEANS
Filed Sept. 2, 1938   2 Sheets-Sheet 1
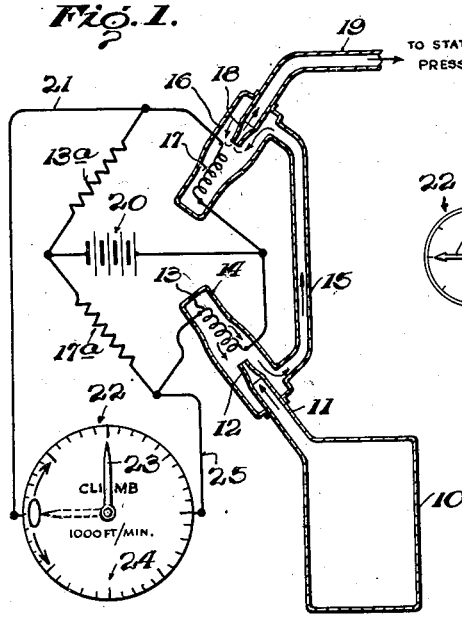
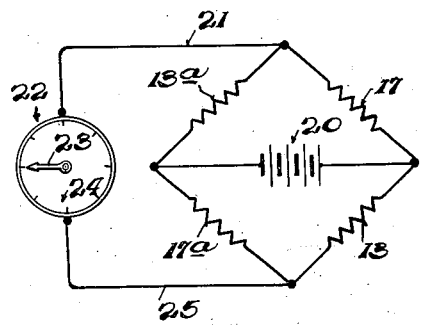
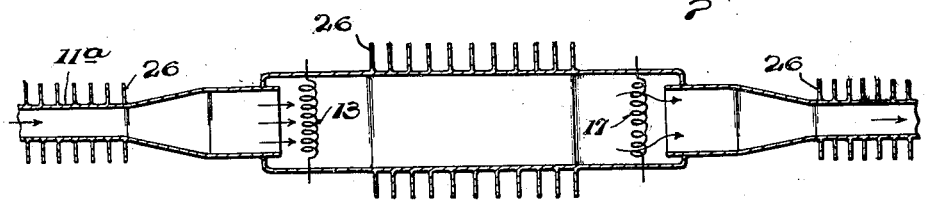
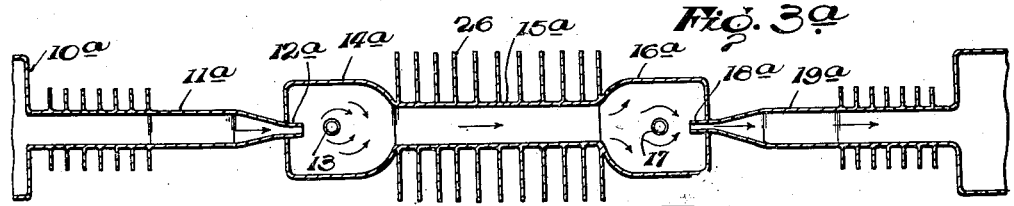
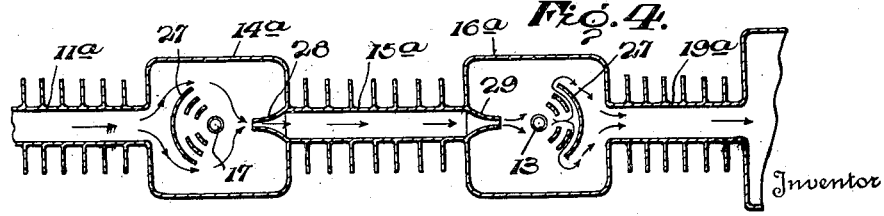
Inventor
Gregory V. Rylsky.
By
Stephen Cerstvik
Attorney Sept. 10, 1940.  G. V. RYLSKY  2,214,181
RATE OF CLIMB RESPONSIVE MEANS
Filed Sept. 2, 1938  2 Sheets-Sheet 2
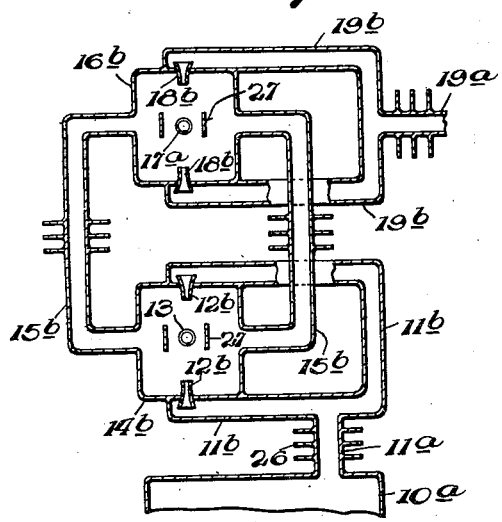
Fig. 5.
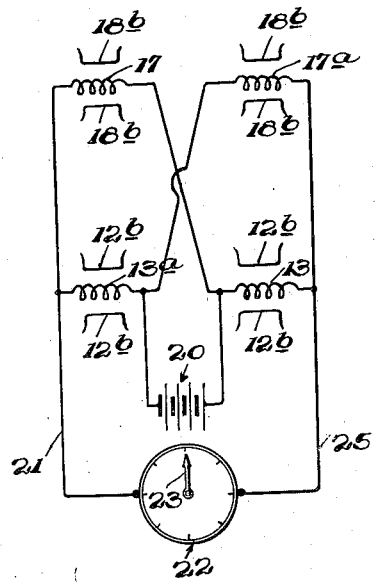
Fig. 5a.
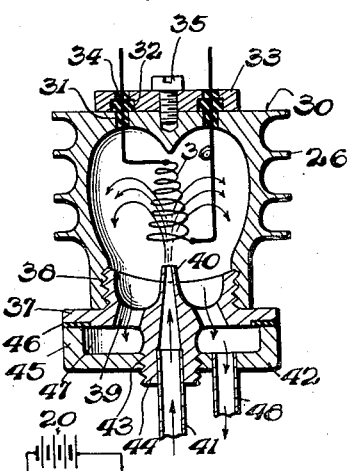
Fig. 6.
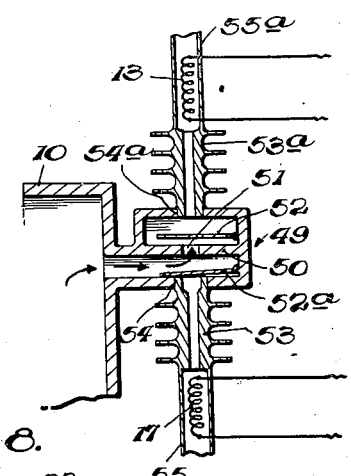
Fig. 7.
Fig. 8.
Inventor
Gregory V. Rylsky.
By Stephen Cerstvik
Attorney Patented Sept. 10, 1940

2,214,181

UNITED STATES PATENT OFFICE 2,214,181

RATE OF CLIMB RESPONSIVE MEANS

Gregory V. Rylsky, New York, N. Y., assignor to Bendix Aviation Corporation, South Bend, Ind., a corporation of Delaware Application September 2, 1938, Serial No. 228,236

11 Claims. (Cl. 264—1)

The present invention relates to indicating and control instruments for aircraft and the like, and more particularly to a rate of climb device for ascertaining the climbing speed and rate of descent of an aircraft.

The invention embodies novel means whereby the changes in force obtained from changes in atmospheric pressure accompanying changes in position of an aircraft are transformed into an electrical force proportional to said change of position.

More specifically, the device embodying the invention is provided for the purpose of transforming the rate of change in pressure accompanying the change in position of a craft into an electrical force proportional to said rate of change.

Similar devices of the prior art have been utilized to indicate a value of the change of position of a craft but such devices have incorporated as a part thereof, a movable diaphragm, vane, piston or other mechanical element. Such devices have been subject to errors due to changes in temperature, changes in the physical properties of the moving element, and changes in the restraining element offering a resistive force to the force proportional to the change in position. Moreover, such devices required the use of mechanical linkages between the movable element and the indicator in order to produce an indication representative of the value of the phenomenon to be indicated. Such mechanical linkages have also been subject to influences producing errors therein.

It is therefore one of the objects of the present invention to provide a novel change of position indicator, whereby the foregoing undesirable characteristics are eliminated.

Another object is to provide an indicating or control device embodying novel means for producing a force proportional to the rate of change of position of an aircraft or the like.

A further object is to provide a novel device whereby a mechanical force proportional to the rate of change of position of a craft is changed into an electrical force of the same proportionality.

Still another object is to provide a novel device comprising means producing a balance of force, and means responsive to rate of change of position of a craft for unbalancing said force whereby an indication of said change of position is obtained.

A further object of the invention is to provide a novel combination comprising means producing a force varying with the rate of change in position of a craft, means providing a balance of electrical forces, and means responsive to said varying force for changing said electrical balance whereby an electrical force is obtained proportional to said rate of change.

Still a further object is to provide a novel combination comprising a Wheatstone bridge and means producing a force proportional to the rate of change of position of a craft to change the balance of said bridge whereby a force is produced proportional to said rate of change.

A still further object of the invention is to provide a novel combination comprising a Wheatstone bridge, means producing a change in an electrical characteristic of one part of said bridge upon change in position of a craft in one direction and means preventing change in the electrical characteristic of said part and producing a change in the electrical characteristic of another part upon change of position of the craft in another direction.

Still another object is to provide novel electrical means for amplifying a force proportional to the change of position of a craft.

The above and further objects and advantages of the invention will appear more fully hereinafter from a consideration of the detailed description which follows, taken together with the accompanying drawings wherein several embodiments of the invention are illustrated. It is to be expressly understood, however, that the drawings are for the purpose of illustration and description only, and are not designed as a definition of the limits of the invention, reference being primarily had for this purpose to the appended claims.

In the drawings wherein like reference characters refer to like parts throughout the several views;

Fig. 1 is a schematic illustration outlining the fundamental theory of applicant's invention and illustrating the device in a state of climb;

Fig. 2 is a schematic illustration indicating in simpler outline the Wheatstone bridge construction of Fig. 1 and showing the circuit in a balanced condition;

Fig. 3 is a sectional elevation of one embodiment of the novel means for modifying a characteristic of the resistors of the bridge of Fig. 1;

Fig. 3a is a top view, in section, of the device illustrated in Fig. 3;

Fig. 4 is a sectional elevation of another embodiment of the device shown in Fig. 3;

Fig. 5 is a schematic illustration of a further embodiment of the device of Fig. 3;

Fig. 5a is a schematic illustration of the circuit embodied in the device of Fig. 5;

Fig. 6 is a detailed cross section of still another embodiment of one of the means for modifying an electrical characteristic of the resistors of the bridge;

Fig. 7 is a still further embodiment of the novel resistance modifying means; and Fig. 8 is a perspective view of a complete system embodying a different form of resistance modifying means.

Referring to the drawings, the invention is shown in the present instance as applied to a rate of climb indicator for an aircraft or the like although it is to be expressly understood that the invention is not to be so limited but may be applied to any device for indicating the change of position of a craft.

Referring to the drawings and more particularly to Fig. 1, 10 designates the casing of an air reservoir which may be heat insulated if desired, and which may be made as a part of the casing enclosing the actuating mechanism of the instrument. Leading from casing 10 is a conduit 11 terminating in a nozzle 12 which, upon flow in one direction, directs fluid upon a resistor 13 enclosed in housing 14. A conduit 15 leads from housing 14 to the interior of a second housing 16 wherein is contained a second resistor 17 forming another arm of a Wheatstone bridge. The fluid is conducted from the housing 14 to housing 16 and discharged by expansion therein without impinging upon the resistor 17, whereby the electrical characteristics thereof remain unchanged. An element 18 serves as a nozzle during flow from a source of static pressure into the chamber 16 and serves as a conduit conducting the fluid away from chamber 16 during the flow from the air reservoir 10 to the source of static pressure by means of conduit 19. The source of static pressure may be the static side of a Pitot tube of the type generally used on aircraft.

The remaining arms of the Wheatstone bridge are formed by resistors 13a and 17a as illustrated in Figs. 1 and 2. A source of electrical energy 20 along with suitable conductors forms one diagonal of the bridge. Conductor 21 leads from one corner of the other diagonal of the bridge to one side of the operating means for an indicator generally designated as 22 which may comprise any well known electrical measuring device for measuring the unbalance in the electrical forces of the bridge or the flow of current produced by said unbalance. The details of said indicator per se do not comprise a part of applicant's invention. Said indicator includes a pointer 23 moving over a dial 24 calibrated to indicate rate of climb or descent in thousands of feet per minute, although it is to be specifically understood that any desirable scale may be utilized. Conductor 25 connects the opposite side of the indicator operating means to the other corner of said diagonal of the bridge whereby the indicator and its electrical connections form the second diagonal of the Wheatstone bridge.

The operation of the device is as follows:

Assuming that the device is mounted on an aircraft and that the aircraft is rising so that it has a certain steady rate of climb, as long as the climb is maintained, a pressure differential will exist between the air in reservoir 10 and the air in conduit 19 leading to a desired source of static pressure on the craft. This pressure differential is due to the fact that as the aircraft climbs to a higher altitude, the barometric pressure becomes less than the pressure in the reservoir 10. By virtue of this pressure differential, air will flow from the reservoir 10 and escape through the nozzle 12 as illustrated by the arrows in Fig. 1. The air will then escape from housing 14 by means of conduit 15 and expand into the interior of housing 16 from which it escapes, without impinging upon resistor 17, by means of nozzle-conduit 18 and conduit 19 to the source of static pressure.

As the air escapes from nozzle 12 and impinges upon resistor 13, the temperature of said resistor, which is maintained at a desired value by the current flow therethrough, is reduced if said resistor has a positive temperature coefficient of resistance, to thereby change the resistance thereof. Under conditions of no flow in either housing 14 or housing 16, the bridge circuit is in equilibrium and no current flow ensues in any part of the network or through the conductors 21, the indicating instrument 22 and the conductor 25 in either direction. Upon a change in the resistance of resistor 13, an unbalancing of the bridge occurs with an ensuing flow of current through the operating mechcanism of indicator 22, whereby the pointer 23 is moved over the scale 24 an amount proportional to the change in the resistance of resistor 13. This change in resistance is proportional to the rate of flow of air thereon from nozzle 12, which in turn is directly proportional to the rate of climb. By a proper selection of the values of the resistors, the electrical energy source, conductors and the scale of the indicator, the indicator can be made to present an indication of the rate of climb in thousands of feet per minute. As long as the craft continues to rise, the air current continues to flow and air is emitted from nozzle 12 to impinge upon the resistor 13 to thereby vary the resistance thereof in proportion to the rate of climb, whereby the indicator 22 is operated to indicate the rate of climb during this period.

Upon a descent of the craft, the barometric pressure becomes greater than the pressure in reservoir 10 and, therefore, air will be emitted from nozzle 18 upon resistor 17 to vary the resistance thereof in the same manner as the resistance of resistor 13 was varied during climb. With the change in the resistance of resistor 17, current is reversed in direction through the indicator 22 as compared to its direction when resistor 13 was varied whereby the indicator 22 will present an indication of the rate of descent which indication will continue to be presented as long as the craft continues its descent.

It is to be noted that upon a climb, resistor 13 is cooled by the impingement of air thereupon but resistor 17 remains substantially unaffected, while upon descent the resistor 17 is cooled by impingement of air thereupon while resistor 13 is not affected. Various changes, alterations and refinements may be made, some of which will now be discussed in detail.

In Fig. 2 is illustrated, in simplified form, a schematic illustration of the Wheatstone bridge as utilized in Fig. 1. The schematic illustration of Fig. 2 is to be borne in mind in connection with the detailed description of the device of Figs. 3 to 8 inclusive.

Referring to Figs. 3 and 3a, there is disclosed one embodiment of the housing means utilized for controlling the flow of air against two of the resistors, which embodiment is merely an illustration of one form of the device schematically illustrated in Fig. 1. In said figures, 11a indicates a conduit leading from a reservoir such as casing 10a (see Fig. 3a) corresponding to conduit 11 and reservoir 10 of Fig. 1, respectively. The arrows indicate the direction of flow which occurs when the craft upon which the device is mounted goes into a climb. Air under pressure flows through conduit 11a and escapes from nozzle 12a to impinge upon a resistor 13 as illustrated and described in connection with Fig. 1. The increase in volume of the housing 14a over the volume enclosed by conduit 11a allows the air to reduce its velocity so that it flows through the conduit 15a and emerges into the interior of housing 16a without any appreciable nozzle effect. The resistor 17, therefore, is not cooled to any appreciable extent and the air escapes by means of nozzle-conduit 18a and conduit 19a to the source of static pressure. Fins 26 are provided extending from the exterior of the conduit and the housings whereby a heat balance of the device, including the heated resistors, is obtained so that a desired temperature is maintained.

In Fig. 4 is illustrated a modification of the device as illustrated in Figs. 3 and 3a. In this modification baffle plates 27 are arranged on one side of the resistors 13 and 17 respectively. As air leaves the conduit 11a, instead of impinging upon the resistor in housing 14a, which in the modification of Fig. 4 is the resistor 17 and not the resistor 13, the air is prevented from impinging upon said resistor 17 by means of said baffles 27 which effectively by-pass the air around resistor 17. The air escapes by means of nozzle-conduit 28 and enters the conduit 15a from which it escapes by means of nozzle 29 to impinge directly upon the resistor 13. Resistor 13 is protected from air impingement in the opposite direction which occurs upon a descent of the craft, by means of baffles 27 similar to the baffles on the other side of resistor 17. It is to be noted therefore, that in the modification of Fig. 4 upon a climb the air again impinges upon the resistor 13 as in Figs. 1, 3 and 3a and that the resistor 17, is effectively shielded against any such impingement by means of baffles 27. Upon a descent, the reverse is true, and resistor 17 will be effectively cooled while resistor 13 will in turn be protected by baffles 27. The operation of the modification of Fig. 4 is otherwise as described in connection with Figs. 1 and 3a.

Referring to Figs. 5 and 5a, a schematic illustration of a modification of the device of Figs. 3 and 3a is illustrated therein. In the modification as illustrated in these figures the device is so constructed that two of the opposite resistors of the bridge are cooled simultaneously upon a climb of the craft while the remaining two resistors are cooled upon a descent thereof. Upon a rise of the craft carrying a device such as illustrated in Figs. 5 and 5a, a differential pressure is produced between the air in reservoir 10a and the air in conduit 19a whereby air escapes from reservoir 10a by means of conduit 11a and is then conveyed by two conduits 11b to two sets of nozzles 12b—12b, as shown in Fig. 5a. These two sets of nozzles direct the air upon both the resistors 13 and 13a so that a cumulative effect is produced upon the bridge circuit.

The combined effects of the cooling of resistors 13 and 13a produce a greater change in the balance of the bridge than is produced when a single resistor is cooled thereby providing an instrument which is more sensitive to the rate of climb. The air, after impinging upon the two resistors 13 and 13a in housing 14b, escapes by means of the two conduits 15b to the interior of housing 16b wherein the baffles 27 prevent any impingement of the air upon the resistors 17 and 17a so that although the opposite resistors 13 and 13a are cumulatively cooled there is no cooling of the resistors 17 and 17a. The air escapes from housing 16b by means of the pair of conduits 19b to conduit 19a and thence to the source of static pressure. Upon a descent, the air impinges upon the pair of resistors 17 and 17a in housing 16b while the baffles 27 in housing 14b prevent the air from impinging upon the resistors 13 and 13a. The operation of the device in Figs. 5 and 5a is otherwise the same as described in connection with the Figs. 3 and 3a.

In Fig. 6 is illustrated another embodiment of the means for modifying an electrical characteristic of the resistors. As illustrated in Fig. 6, these means comprise a housing 30 provided with fins 26 as in the embodiment of Figs. 3 and 3a. Formed in the upper part of housing 30 is a pair of openings 31 into which are inserted porcelain bushings 32 held in place by a disc shaped clamp 33 provided with openings 34 and fastened to housing 30 by means of screws 35. A resistor coil 36 is mounted internally of the housing with its ends extending outwardly therefrom through the bushings 32 in the openings 31 and out through the openings 34, said coil being held in place by the tight fit in the bushings.

A threaded cap is screwed into threaded opening 38 provided in housing 30. Said cap is provided with a series of openings 39 and is formed into a nozzle 40 extending in the direction of coil 36. A conduit 41 leads to the nozzle 40 and is connected in any desired manner to the cap 37. A second cap 42 having an internally threaded opening 43 is screwed into position on cap 37 by means of threaded extension 44 thereof, with the flange 45 of cap 42 abutting a washer 46 to form a sealed chamber 47 between the two caps. A conduit 48 is fastened to the cap 42 in any desired manner.

The housing 30 is connected to the remainder of the device by means of the conduits 41 and 48 so that, for example, upon a climb, air is supplied to conduit 41 from a source such as a reservoir 10 as in Fig. 1. This air escapes by means of nozzle 40 and impinges upon the coil 36 to thereby cool the same and change the electrical characteristics thereof. This air then escapes by means of openings 39 into chamber 47 from which the air is conducted by means of conduit 48 to another housing similar to the housing 30. It is to be noted that the housing 30 of Fig. 6 may be connected into a system in the same manner as housings 14 or 14a of Figs. 1, 3 and 3a or the housing 30 may be connected into a system such as illustrated in Figs. 5 and 5a whereby opposite resistors of the resistance bridge may be cooled simultaneously.

A further embodiment of the invention is illustrated in Fig. 7. In this embodiment a specially constructed fitting 49 leads from a reservoir such as 10. Formed in a partition 50 of said fitting is an opening 51. A balanced flap type valve 52 is pivotally mounted at one end so as to close off the opening 51 when pressure is exerted upon the top of said valve and valve 52 serves to open the passage through opening 51 when pressure is exerted upon the bottom of said valve. A conduit 53 is fitted to an opening 54 in said fitting 49 and provides a channel to housing 55 in which is insulatingly mounted a resistor such as 17 of Fig. 1. Mounted within the fitting 49 is a second flap valve 52a which is so pivotally mounted as to close off the opening 54 leading to the conduit 53 when pressure is exerted upon the top thereof but which opens to admit air from conduit 53 to the fitting 49 when pressure is exerted upon the bottom thereof.

A second conduit 53a is fitted into an opening 54a in the special fitting 49 and leads to housing 55a which encloses an insulatingly mounted resistor such as 13 of Fig. 1.

The operation of the device shown in Fig. 7 is as follows:

Upon an ascent of a craft on which the device is mounted, differential pressure is created between the reservoir 10 and a source of static pressure remote therefrom. Air thereupon escapes from reservoir 10 to the interior of fitting 49. The air pressure on the top of valve 52 and on the bottom of 52a being less than the pressure within fitting 49, valve 52 is opened and 52a is closed, as illustrated in Fig. 7, whereby the air escapes through conduit 53a to impinge upon resistor 13 while air is prevented from escaping through conduit 53 to change the electrical characteristics of resistor 17.

Upon a descent, the air pressure in conduits 53a and 53 is higher than in the interior of fitting 49 whereby valve 52 is closed and valve 52a is opened so that air impinges upon resistor 17 by means of a nozzle (not shown) and flows into the fitting 49 by means of the opened valve 52a while the valve 52 is closed to thereby prevent any flow past the resistor 13, so that the electrical characteristics thereof are not altered. The device in Fig. 7 may be utilized to replace one half of the bridge of Fig. 1 or two such devices may be utilized so as to replace one half of a device such as illustrated in Figs. 5 and 5a.

In Fig. 8 there is illustrated a practical embodiment of the invention illustrated schematically in Figs. 5 and 5a. In the operation of the embodiment shown in Fig. 8, upon a climb, air escapes from the reservoir 10a by means of conduit 11a and issues from nozzle 12c to impinge upon resistors 13 and 13a simultaneously. The air then escapes by means of openings 56 to conduit 15b leading to the casing 16b. Within the casing 16b the air escapes, by means of openings 57, to the chamber containing the resistors 17 and 17a but due to the area of openings 57 the air does not impinge upon the resistors. The air then escapes by means of the opening in nozzle 18c to conduit 19a and thence to the source of static pressure. The operation is otherwise as described in connection with Figs. 5 and 5a.

Novel means are thus provided whereby the rate of change in position of a craft is utilized to produce an electrical force varying in proportion to said rate of change.

Although several embodiments of the invention have been illustrated and described, other changes and modifications in form, materials and relative arrangement of parts, which will now appear to those skilled in the art, may be made without departing from the scope of the invention. Reference is therefore to be had to the appended claims for a definition of the limits of the invention.

What is claimed is:

1. In a device for measuring the rate of climb of a craft, a Wheatstone bridge, and means responsive to the rate of climb of said craft for simultaneously varying the resistance of resistors in opposed legs of said bridge.

2. In a device for measuring the change of position of a craft, a plurality of resistors forming an electrical bridge, an electrical source producing a desired energy condition in said bridge, means responsive to the change in position of said craft for producing a flow of fluid and means for directing said fluid against certain of said resistors only, to vary the resistance thereof whereby a change in said energy condition is produced proportional to said change of position in one direction, and means for directing said fluid against others of said resistors only, upon change in direction of said change of position.

3. In a device for measuring the rate of change in position of a craft, a plurality of resistors forming an electrical bridge, an electrical source connected to said bridge and producing a desired energy condition therein, means responsive to the rate of change in position of said craft for producing a flow of fluid, means for directing said fluid against certain of said resistors to vary the resistance thereof and means shielding others of said resistors from said flow upon climb in one direction, means shielding said certain resistors, and means directing said fluid against said others upon change of direction of said change in position.

4. In a device for measuring the change in position of a craft, a plurality of electrical elements forming an electrical bridge, certain of said elements having electrical characteristics variable by changes in temperature, means responsive to the change in position of said craft for impinging fluid against desired certain elements, in one direction of said flow, to produce a change in temperature therein, means shielding said certain elements against said flow upon a reversal of said flow, and means for localizing said temperature change to the elements impinged upon by said fluid.

5. In a device for measuring the change in position of a craft, means forming an energized electrical bridge having two opposed pairs of electrical elements, means responsive to the change in position of said craft for simultaneously changing the electrical characteristics of the elements of one of said pairs when said craft is moving in one direction, means preventing a change in the electrical characteristics of the other pair of elements during said direction of movement, and means for reversing the electrical status of said pairs upon a change in the direction of movement.

6. In a device for measuring the change in position of a craft, electrical elements subjected to a given temperature and an electrical source for forming a balanced electrical bridge, means responsive to change of position of said craft for producing a flow of fluid in one direction, valve means for directing said flow against certain of said elements to vary the temperature thereof in one direction of flow and valve means for shutting off said flow from said first certain elements and directing the same against certain other elements to vary the temperature of the latter during a reversal of said direction of flow.

7. In a device of the character described, means for producing a pressure differential proportional to the change in position of a craft, an energized electrical bridge including a pair of electrical resistors maintained at a desired temperature whereby a desired electrical characteristic thereof is maintained, means controlled by said pressure differential whereby a flow of fluid is directed about one of said resistors for varying the temperature thereof and heat radiating means between said resistors whereby the heat conveyed by said fluid is dissipated prior to the arrival of said fluid at said second resistor.

8. In a device of the character described, an energized electrical bridge including a pair of electrical resistors heated to a desired temperature whereby a desired electrical characteristic thereof is maintained, means responsive to the change in position of a craft for producing a flow of fluid, nozzle means for directing said fluid flow against one of said resistors in one direction of flow, baffle means diverting said fluid from the other resistor while said direction of flow is maintained, nozzle means for directing said fluid against said other resistor upon a reversal of direction of flow and baffle means for diverting said fluid from the first of said resistors upon said reversal of flow.

9. In a device of the character described, an energized bridge including two pairs of oppositely located resistors heated to a desired temperature whereby a desired electrical balance is maintained, means responsive to the change in position of a craft for producing a flow of fluid, nozzle means for directing said flow simultaneously against the resistors of one of said pairs in one direction of flow and nozzle means for directing said flow simultaneously against the resistors of the other pair upon reversal of said direction of flow.

10. In a device of the character described, an electrical resistor, a casing open at one end, means insulatingly mounting said resistor in position within said casing, a plurality of fins provided on said casing, and a cap for sealing the open end of said casing, said cap comprising a fluid nozzle for directing fluid against said resistor mounted in said casing.

11. In a device of the character described, a pressure reservoir, a conduit leading from said reservoir, a resistor insulatingly mounted in position within said conduit, one-way valve means for directing flow from said reservoir to said conduit only, a second conduit connected to said reservoir, a resistor insulatingly mounted in said second conduit and one-way valve means for directing flow from said conduit to said reservoir only.

GREGORY V. RYLSKY.